US012736851B2

(12) United States Patent
Lee et al.

(10) Patent No.: US 12,736,851 B2
(45) Date of Patent: Sep. 15, 2026

(54) OPTICAL ELEMENT DRIVING MECHANISM

(71) Applicant: Actutek Corporation, Taoyuan City (JP)

(72) Inventors: Chuan-Min Lee, Taoyuan City (TW); Shu-Shan Chen, Taoyuan City (TW); Pai-Jui Cheng, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 153 days.

(21) Appl. No.: 18/768,678

(22) Filed: Jul. 10, 2024

(65) Prior Publication Data

US 2025/0020975 A1 Jan. 16, 2025

Related U.S. Application Data

(60) Provisional application No. 63/526,751, filed on Jul. 14, 2023.

(30) Foreign Application Priority Data

Jan. 5, 2024 (CN) ......................... 202420032110.5

(51) Int. Cl.
*G03B 5/00* (2021.01)
*G03B 30/00* (2021.01)

(52) U.S. Cl.
CPC ............... *G03B 5/00* (2013.01); *G03B 30/00* (2021.01); *G03B 2205/0069* (2013.01)

(58) Field of Classification Search
CPC ... G03B 2205/0069; G03B 30/00; G03B 5/00
See application file for complete search history.

(56) References Cited

U.S. PATENT DOCUMENTS

| | | | | |
|---|---|---|---|---|
| 11,237,353 | B2 * | 2/2022 | Hagiwara | H02K 41/031 |
| 11,740,428 | B2 * | 8/2023 | Hung | H01F 7/02 396/448 |
| 2007/0035210 | A1 * | 2/2007 | Sasaki | H02N 2/025 310/329 |
| 2007/0229702 | A1 * | 10/2007 | Shirono | G02B 13/009 348/374 |
| 2018/0224631 | A1 * | 8/2018 | Ichihashi | H01H 47/22 |
| 2020/0183123 | A1 * | 6/2020 | Hagiwara | H02K 41/031 |
| 2022/0308306 | A1 * | 9/2022 | Wu | G02B 27/646 |
| 2022/0308307 | A1 * | 9/2022 | Chen | G02B 27/646 |
| 2022/0308357 | A1 * | 9/2022 | Chen | H01F 7/02 |
| 2022/0308421 | A1 * | 9/2022 | Hung | G02B 7/04 |

FOREIGN PATENT DOCUMENTS

| | | |
|---|---|---|
| CN | 216817056 U | 6/2022 |

* cited by examiner

*Primary Examiner* — Antoinette T Spinks
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion, a fixed portion, and a driving component. The movable portion is configured to connect an optical element. The movable portion is movable relative to the fixed portion. The driving component is configured to drive the movable portion to move relative to the fixed portion.

18 Claims, 7 Drawing Sheets

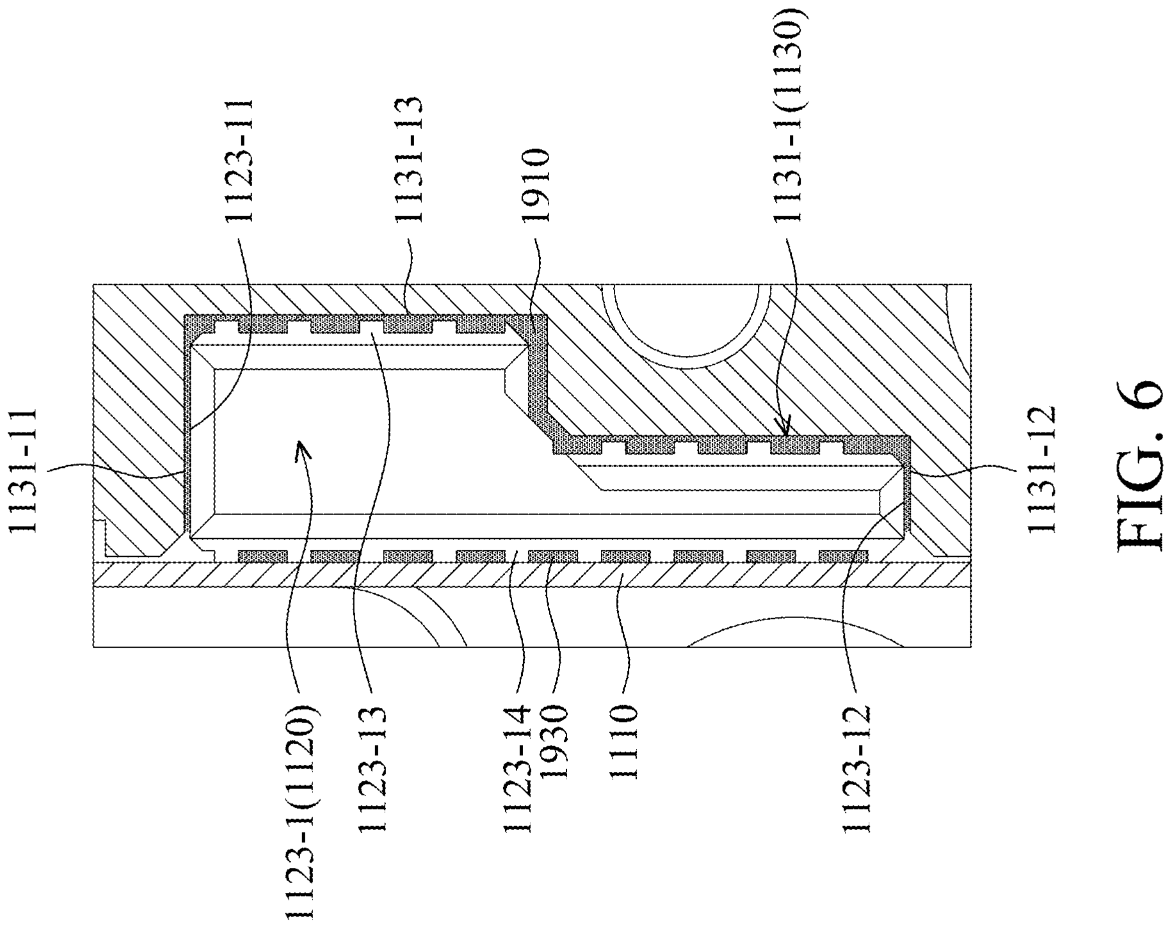
FIG. 6
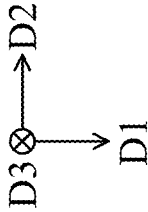

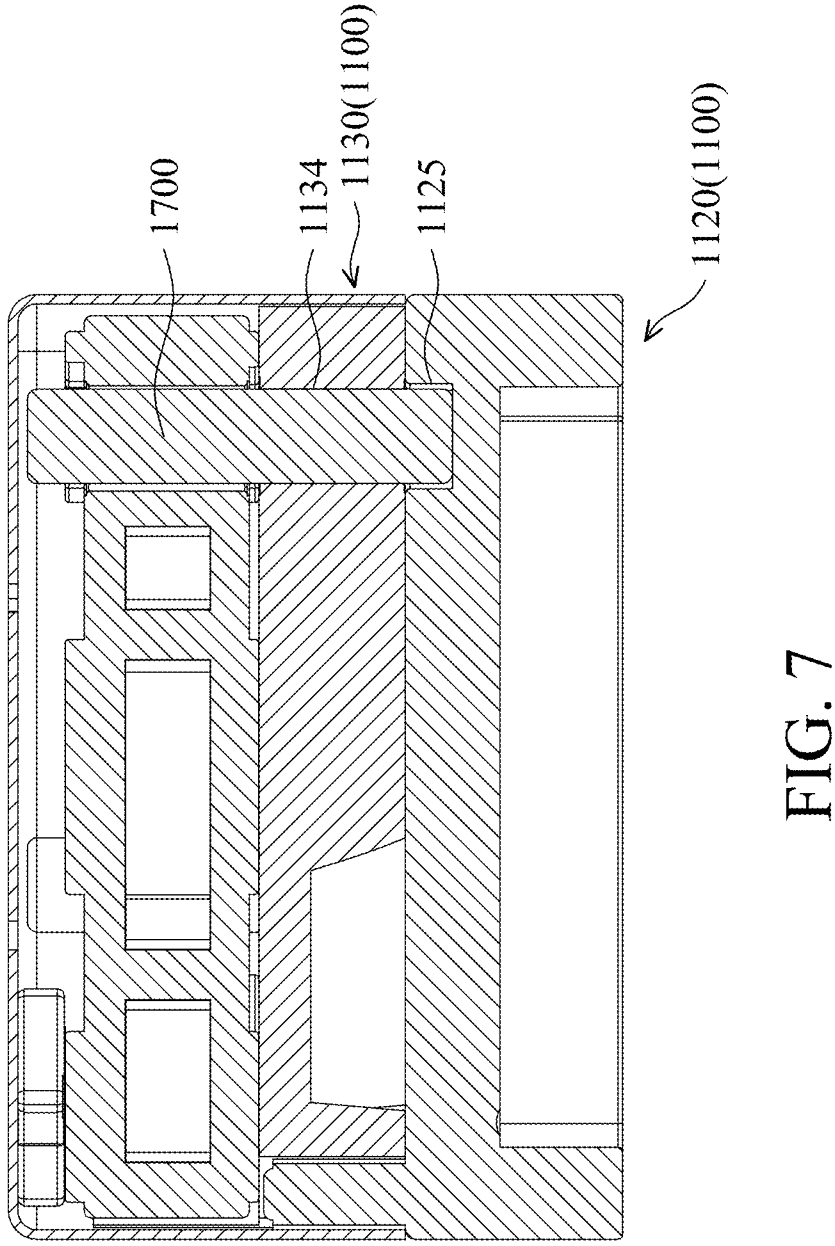
FIG. 7
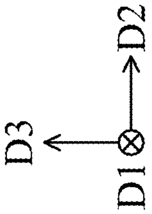

OPTICAL ELEMENT DRIVING MECHANISM

CROSS REFERENCE TO RELATED APPLICATIONS

This application claims the benefit of U.S. Provisional Application No. 63/526,751, filed Jul. 14, 2023, the entirety of which is incorporated by reference herein.

This Application claims priority of China Patent Application No. 2024200321105, filed on Jan. 5, 2024, the entirety of which is incorporated by reference herein.

BACKGROUND OF THE INVENTION

Field of the Invention

The present invention relates to an optical element driving mechanism, and in particular it relates to an optical element driving mechanism with a positioning component.

Description of the Related Art

With the development of technology, many electronic devices today, such as smartphones, have the capability to take photos and record videos. The use of these electronic devices is becoming increasingly common, and they are being designed to be more convenient and lightweight to provide users with more options.

The aforementioned electronic devices with photo or video recording capabilities are usually equipped with an optical element driving mechanism to move the optical elements (such as lenses) along the optical axis, achieving functions like Auto Focus (AF) or Optical Image Stabilization (OIS). Light can pass through these optical elements to form an image on the image sensor. However, the current trend for mobile devices is to have smaller sizes and higher durability. Therefore, how to effectively reduce the size of the optical element driving mechanism and improve its durability has become an important issue.

BRIEF SUMMARY OF THE INVENTION

An embodiment of the present invention provides an optical element driving mechanism, which includes a movable portion, a fixed portion and a driving component. The movable portion is configured to connect an optical element. The movable portion is movable relative to the fixed portion. The driving component is configured to drive the movable portion to move relative to the fixed portion.

According to some embodiments of the present invention, the fixed portion includes a frame, a base and a positioning component. The base is fixedly connected to the frame. The frame is fixedly connected to the base via the positioning component. The driving component is partially connected to the frame. The driving component is partially connected to the base.

According to some embodiments of the present invention, the fixed portion has a first side and a second side. The positioning component includes a first positioning portion, a first corresponding portion, a second positioning portion, a second corresponding portion, a third positioning portion, a third corresponding portion, a fourth positioning portion and a fourth corresponding portion. The first corresponding portion corresponds to the first positioning portion. The first positioning portion is located on the frame or the base, and the first corresponding portion is located on the other of the frame or the base. The second corresponding portion corresponds to the second positioning portion. The third corresponding portion corresponds to the third positioning portion. The fourth corresponding portion corresponds to the fourth positioning portion. The first positioning portion and the second positioning portion are arranged along a first axis. The third positioning portion and the fourth positioning portion are arranged along a second axis. The first axis and the second axis are not parallel to each other. The first positioning portion and the second positioning portion are located on the first side of the fixed portion, and the third positioning portion and the fourth positioning portion are located on the second side of the fixed portion.

According to some embodiments of the present invention, the positioning component further includes a first reinforcing portion, a first containing portion, a first connecting element, a second reinforcing portion, a second containing portion and a second connecting element. The first reinforcing portion is located between the first positioning portion and the second positioning portion. The first containing portion corresponds to the first reinforcing portion. The first connecting element is disposed between the first reinforcing portion and the first containing portion. The second reinforcing portion is located between the third positioning portion and the fourth positioning portion. The second containing portion corresponds to the second reinforcing portion. The second connecting element is disposed between the second reinforcing portion and the second containing portion. The maximum distance between the first positioning portion and the first corresponding portion is smaller than the maximum distance between the first reinforcing portion and the first containing portion.

According to some embodiments of the present invention, the positioning component further includes a positioning element and a corresponding element. The positioning element is located on the first side of the fixed portion. The first positioning portion is located on the positioning element. The first reinforcing portion is formed on the positioning element. The corresponding element corresponds to the positioning element. The first corresponding portion is located on the corresponding element. When viewed along a third axis, the positioning element has a long strip structure extending along the first axis.

According to some embodiments of the present invention, the fixed portion further includes a housing, and the housing is fixedly connected to the frame or the base via the positioning component. The positioning component includes an outer portion and a third connecting element. The outer portion is configured to correspond to the housing of the fixed portion. The outer portion has a groove. The third connecting element is disposed on the outer portion. The outer portion is formed on the positioning element.

According to some embodiments of the present invention, the driving component includes a driving element, a transmitting element and a counterweight element. The driving element is configured to generate driving force. The transmitting element is configured to transmit driving force. The counterweight element is made of metal and is connected to the driving element. The driving element is located between the transmitting element and the counterweight element. The transmitting element is connected to the frame. The counterweight element is connected to the base. The driving element does not contact the base nor frame.

According to some embodiments of the present invention, the optical element driving mechanism further includes a protective component to correspond to the driving component. The fixed portion further includes a housing. The protective component includes a first protective element, a second protective element and a first intermediate element. The first protective element surrounds the driving component. The second protective element is disposed between the first protective element and the driving component. The second protective element directly contacts the first protective element and the driving component. The Young's modulus of the first intermediate element is greater than the Young's modulus of the first protective element. The first intermediate element is in direct contact with the housing. The first protective element is fixedly connected to the fixed portion or the movable portion via the first intermediate element.

According to some embodiments of the present invention, the protective component further includes a second intermediate element. The driving component is connected to the fixed portion or the movable portion via the second intermediate element. The Young's modulus of the second intermediate element is different from the Young's modulus of the first protective element. The Young's modulus of the second intermediate element is greater than the Young's modulus of the first protective element. The second intermediate element directly contacts the transmitting element. The second intermediate element is in direct contact with the frame. The Young's modulus of the first intermediate element is greater than the Young's modulus of the second intermediate element.

According to some embodiments of the present invention, the protective component further includes a third intermediate element. The third intermediate element directly contacts the counterweight element, the driving element and the base. The second intermediate element is located between the first protective element and the third intermediate element. The driving component is connected to the fixed portion or the movable portion via the third intermediate element. The Young's modulus of the third intermediate element is different from the Young's modulus of the first protective element. The Young's modulus of the third intermediate element is greater than the Young's modulus of the first protective element. The Young's modulus of the third intermediate element is different from the Young's modulus of the second intermediate element. The Young's modulus of the third intermediate element is smaller than the Young's modulus of the second intermediate element.

BRIEF DESCRIPTION OF THE DRAWINGS

The embodiments of the present invention is described in detail below with reference to the accompanying drawings. It should be noted that, according to common practice in the industry, various features are not drawn to scale and are only used for illustrative purposes. In fact, the dimensions of components may be arbitrarily enlarged or reduced to clearly depict the features of the invention.

FIG. 6 shows a partial enlarged view of the optical element driving mechanism according to some embodiments of the present invention.

FIG. 7 shows a cross-sectional view taken along line B-B' in FIG. 1.

DETAILED DESCRIPTION OF THE INVENTION

Unless otherwise defined, all terms, including technical and scientific terms, used herein have the same meaning as commonly understood by one of ordinary skill in the art to which this disclosure belongs. It is understood that these terms, such as terms defined in commonly used dictionaries, should be interpreted to have a meaning consistent with the background or context of the relevant technology and the present invention, and should not be interpreted in an idealized or overly formal manner, unless otherwise defined herein.

Furthermore, ordinal numbers such as "first," "second," etc., used in this specification and claims to modify elements of the claims, do not inherently imply or represent any chronological order of the claimed elements, nor do they signify any sequence between one claimed element and another, or the order of manufacturing methods. The use of such numbers is solely to distinguish one claimed element with a certain name from another claimed element with the same name.

Additionally, in some embodiments of the present invention, terms related to joining or connecting, such as "connect," "interconnect," etc., unless specifically defined, can refer to two structures being in direct contact or not in direct contact, with other structures placed between them. Furthermore, these terms related to joining or connecting can include scenarios where both structures are movable or both structures are fixed.

Figure 1:
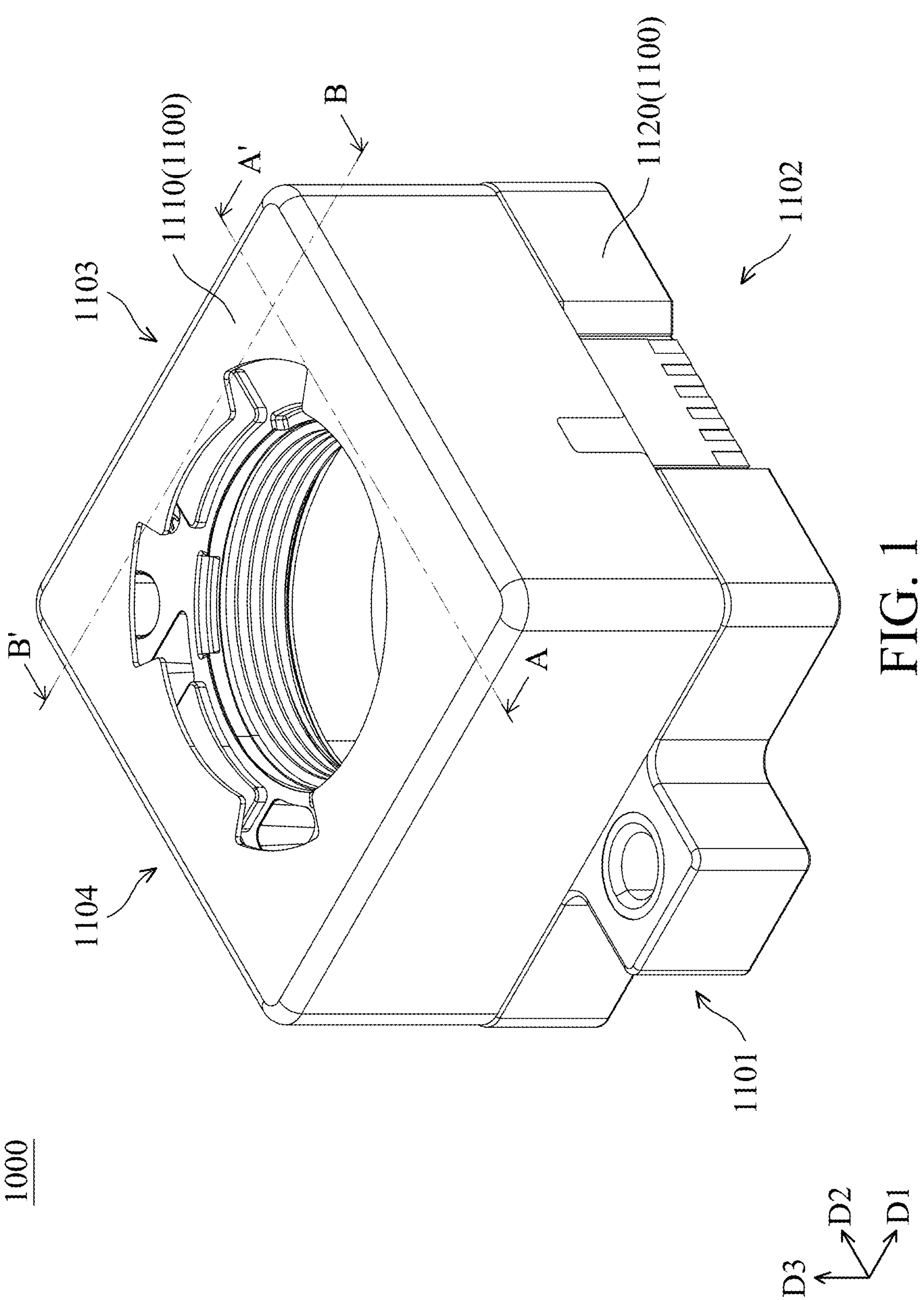
FIG. 1 is a perspective view of an optical element driving mechanism according to some embodiments of the present invention.
Figure 2:
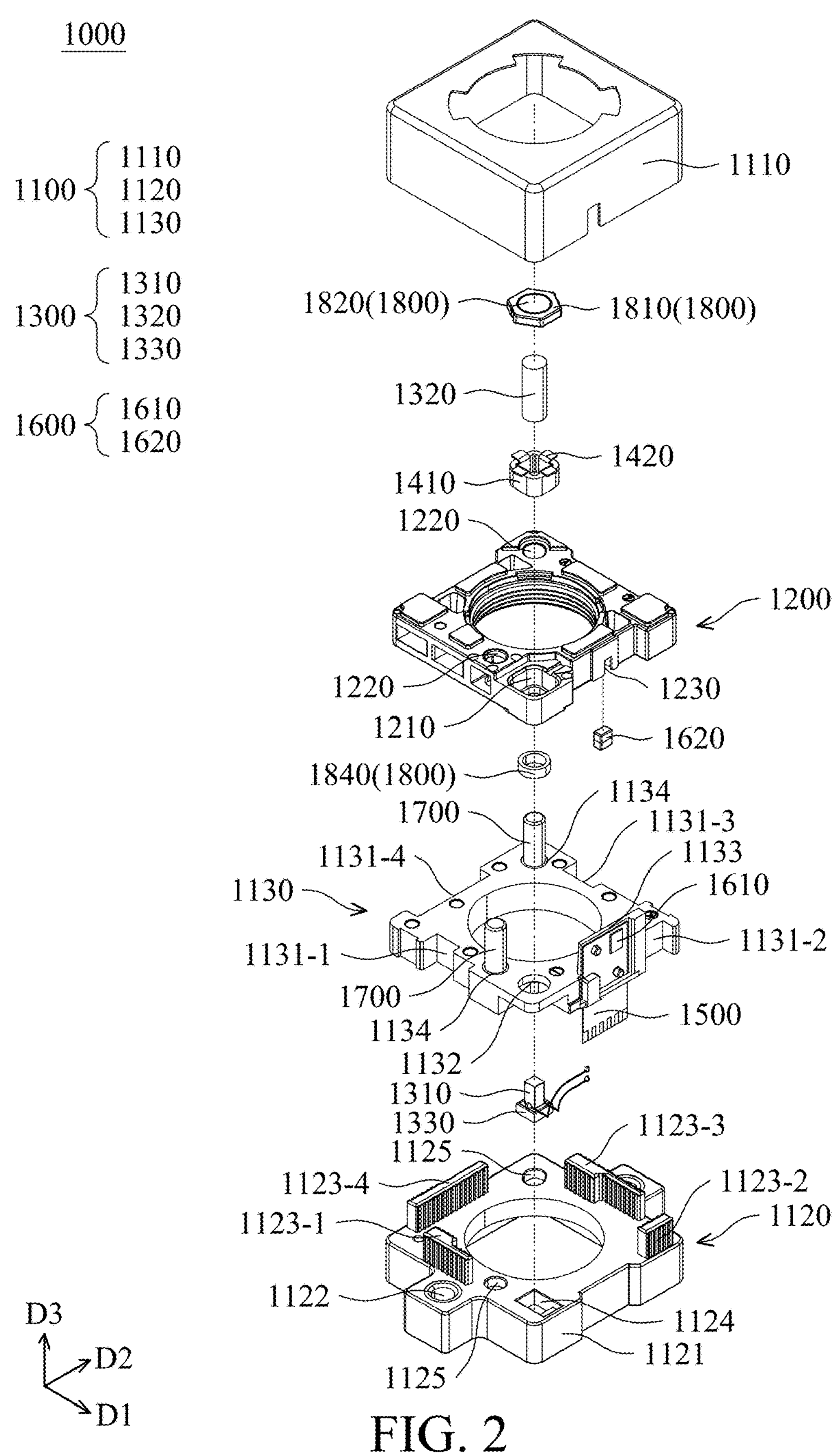
FIG. 2 is an exploded view of the optical element driving mechanism according to some embodiments of the present invention.
Figure 3:
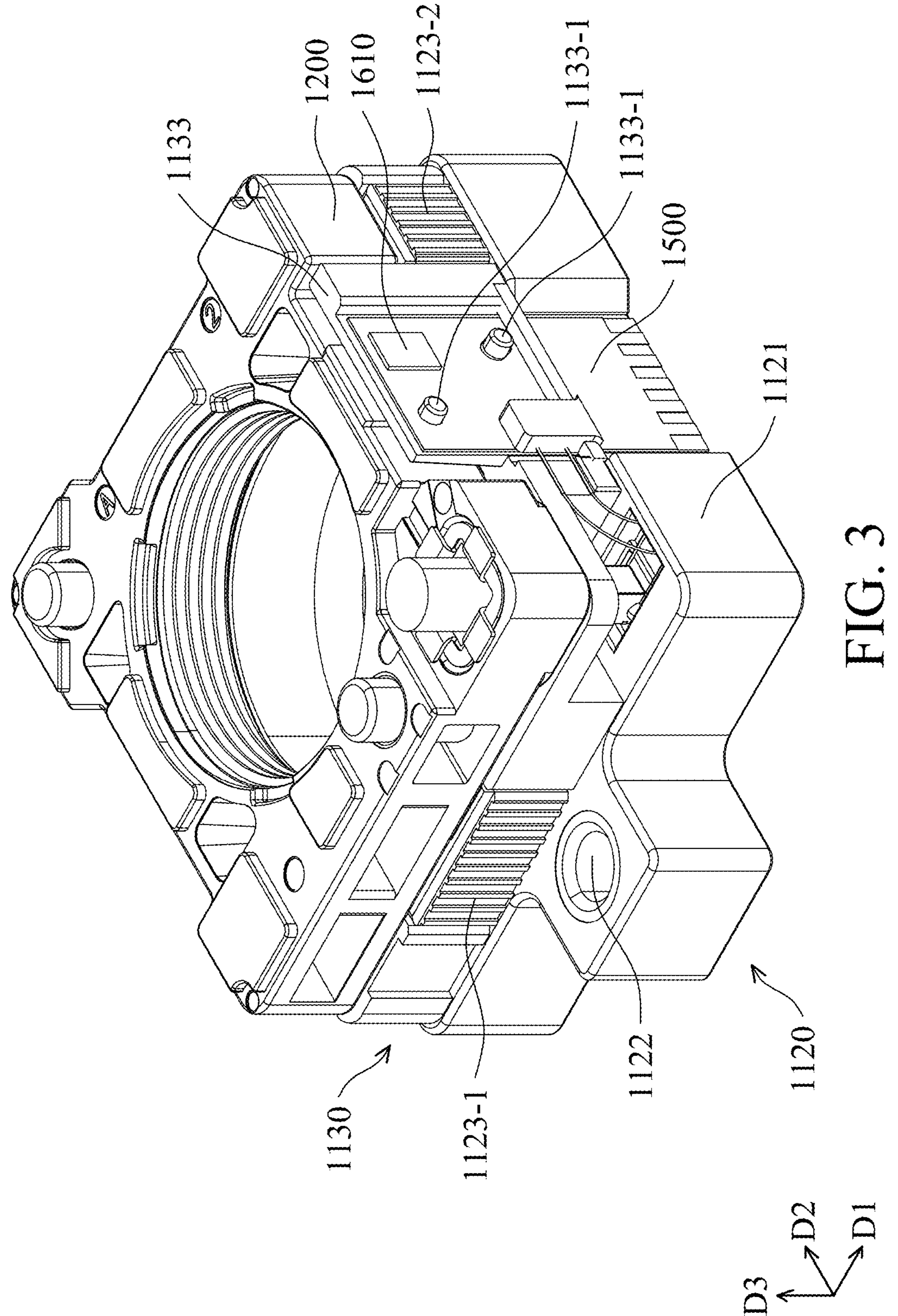
FIG. 3 is a perspective view of part of the optical element driving mechanism according to some embodiments of the present invention.
Figure 4:
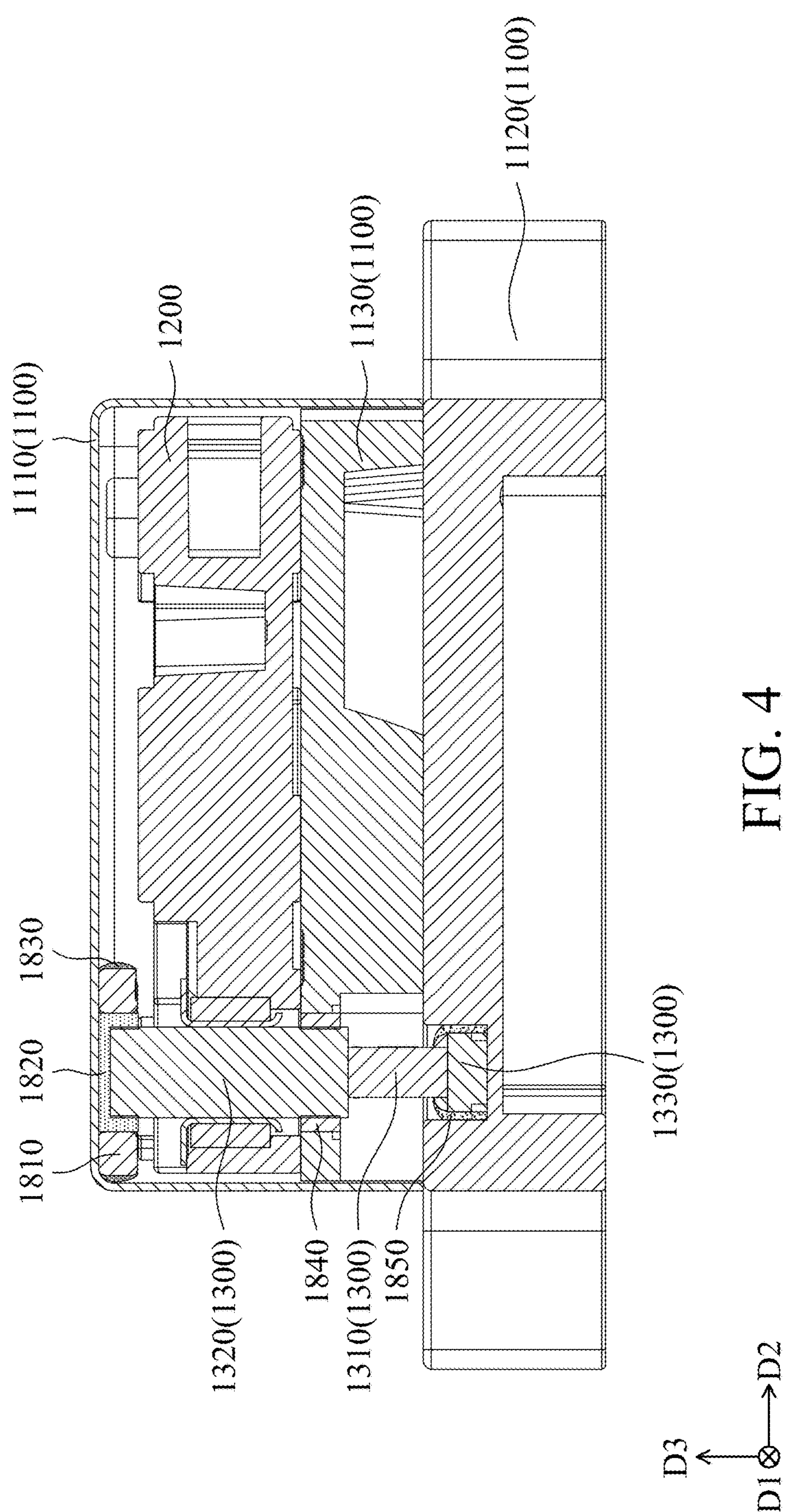
FIG. 4 shows a cross-sectional view taken along line A-A' in FIG. 1.

FIG. 1 is a perspective view of an optical element driving mechanism 1000 according to some embodiments of the present invention. FIG. 2 is an exploded view of the optical element driving mechanism 1000 according to some embodiments of the present invention. FIG. 3 is a perspective view of a portion of the optical element driving mechanism 1000 according to some embodiments of the present invention. FIG. 4 shows a cross-sectional view taken along line A-A' in FIG. 1.

Please refer to FIG. 1 and FIG. 2 below. As shown in FIGS. 1 and 2, the optical element driving mechanism 1000 includes a fixed portion 1100, a movable portion 1200, a driving component 1300, a first elastic element 1410, a second elastic element 1420, a circuit component 1500, a sensing component 1600, two supporting elements 1700 and a protective component 1800.

As shown in FIG. 1, the fixed portion 1100 has a first side 1101, a second side 1102, a third side 1103 and a fourth side 1104. As shown in FIG. 2, the fixed portion 1100 includes a housing 1110, a base 1120 and a frame 1130.

As shown in FIG. 1, the first side 1101 is adjacent to the second side 1102. The second side 1102 is adjacent to the third side 1103. The third side 1103 is adjacent to the fourth side 1104. The fourth side 1104 is adjacent to the first side 1101. The first side 1101 and the third side 1103 are two opposite sides of the fixed portion 1100. The second side 1102 and the fourth side 1104 are two opposite sides of the fixed portion 1100.

In some embodiments of the present invention, the housing 1110 of the fixed portion 1100 is combined with the base 1120 to form a space for accommodating other components of the optical element driving mechanism 1000. The base 1120 of the fixed portion 1100 is fixedly connected to the frame 1130.

In some embodiments of the present invention, as shown in FIG. 2, the base 1120 includes a body 1121, a connection opening 1122, and four positioning elements 1123-1, 1123-2, 1123-3, 1123-4, a groove 1124 and two openings 1125.

Please briefly refer to FIG. 3. As shown in FIG. 3, the body 1121 of the base 1120 refers to the portion of the base 1120 that does not overlap the frame 1130 when viewed along a first axis D1. The connection openings 1122 of the base 1120 are located on opposite sides of the base 1120 and are configured to fix the optical element driving mechanism 1000 to other modules (not shown).

Please refer back to FIG. 2. The positioning elements 1123-1, 1123-2, 1123-3 and 1123-4 all extend from the body 1121 in the direction of a third axis D3. The positioning element 1123-1 and the positioning element 1123-3 each have a rectangular structure extending in the direction of the first axis D1. The positioning element 1123-2 and the positioning element 1123-4 each have a rectangular structure extending in the direction of a second axis D2. Additional details about base 1120 are described later.

In some embodiments of the present invention, the frame 1130 includes four corresponding elements 1131-1, 1131-2, 1131-3, 1131-4, an opening 1132, a retaining wall 1133 and two openings 1134, the details of which are described later.

In some embodiments of the present invention, the movable portion 1200 is configured to connect an optical element (not shown). The movable portion 1200 is movable relative to the fixed portion 1100. The movable portion 1200 includes a receiving portion 1210, two openings 1220 and a containing space 1230, the details of which are described in detail later.

In some embodiments of the present invention, the driving component 1300 is configured to drive the movable portion 1200 to move relative to the fixed portion 1100. The driving component 1300 is partially connected to the frame 1130, and the driving component 1300 is partially connected to the base 1120, which are described in detail below. The driving component 1300 includes a driving element 1310, a transmitting element 1320 and a counterweight element 1330.

In some embodiments of the present invention, the driving element 1310 is configured to generate a driving force. The transmitting element 1320 is disposed on the receiving portion 1210 of the movable portion 1200 via the first elastic element 1410 and the second elastic element 1420 to transmit the driving force to the movable portion 1200. The counterweight element 1330 is made of metal and connected to the driving element 1310. The driving element 1310 is located between the transmitting element 1320 and the counterweight element 1330.

In some embodiments of the present invention, the driving element 1310 may have a long strip structure and extend along the direction in which the third axis D3 extends. The transmitting element 1320 is connected to frame 1130. The counterweight element 1330 is connected to base 1120. Specifically, the counterweight element 1330 is disposed in the groove 1124 of the base 1120. The driving element 1310 does not contact the base 1120 and the frame 1130.

In particular, the material of the driving element 1310 may include piezoelectric material. When an electric field (voltage) is applied to the surface of the piezoelectric material, the electric dipole moments are elongated due to the electric field. The piezoelectric material resists this change by elongating in the direction of the electric field, thereby producing mechanical deformation, which in turn drives the transmitting element 1320 to move.

For example, the electric dipole moment of the driving element 1310 may be designed to extend on the third axis D3 to drive the transmitting element 1320 to move on the third axis D3. The density of the counterweight element 1330 may be greater than the density of the transmitting element 1320 to resist reaction forces when the driving element 1310 is driven. In some embodiments of the present invention, the material of the transmitting element 1320 may include carbon fiber, and the material of the counterweight element 1330 may include metal.

In some embodiments of the present invention, the transmitting element 1320 may be disposed in the first elastic element 1410 and the second elastic element 1420. The first elastic element 1410 is disposed in the receiving portion 1210 of the movable portion 1200. In this way, the transmitting element 1320 may drive the movable portion 1200 to move relative to the fixed portion 1100 through the first elastic element 1410 and the second elastic element 1420.

Specifically, the transmitting element 1320 may be disposed in the second elastic element 1420, and the second elastic element 1420 may be disposed in the first elastic element 1410 and partially exposed from the first elastic element 1410. In some embodiments of the present invention, the first elastic element 1410 and the second elastic element 1420 may be made of different materials.

For example, in some embodiments of the present invention, the first elastic element 1410 may include a soft material, and the second elastic element 1420 may include a metal material. The first elastic element 1410 and the second elastic element 1420 may be movably connected to the transmitting element 1320 through frictional contact, allowing for the precise positioning of the transmitting element 1320.

In some embodiments of the present invention, the driving element 1310 is electrically connected to the circuit component 1500, whereby an electrical signal may be provided from the circuit component 1500 to control the driving element 1310 of the driving component 1300. The circuit component 1500 is disposed on the retaining wall 1133 of the frame 1130.

As shown in FIG. 3, when viewed along the direction of the first axis D1, the retaining wall 1133 of the frame 1130 may partially overlap the movable portion 1200. The circuit component 1500 is a sheet-like structure that extends in the plane formed by the second axis D2 and the third axis D3. The circuit component 1500 may be a printed circuit board. As shown in FIG. 3, the retaining wall 1133 includes two protrusions 1133-1. The protrusion 1133-1 each passes through corresponding hole on the circuit component 1500 to position the circuit component 1500 on the retaining wall 1133.

Please refer back to FIG. 2. The sensing component 1600 includes a sensing element 1610 and a corresponding element 1620. The sensing element 1610 is disposed on the circuit component 1500 to sense the position of the movable portion 1200 relative to the fixed portion 1100. The corresponding element 1620 is provided in the containing space 1230 of the movable portion 1200.

The sensing element 1610 corresponds to corresponding element 1620. In particular, the corresponding element 1620 may be a permanent magnet, and the sensing element 1610 may sense changes in the magnetic field of the corresponding element 1620 and determine the position of the movable portion 1200 through a control element (not shown).

Alternatively, the sensing element 1610 may be an all-in-one integrated circuit (IC) that packages both the sensing IC and the control IC within the same package. This allows the sensing element 1610 to detect the magnetic field changes of the corresponding element 1620 to determine the position of the movable portion 1200, then control the movable portion 1200 to move to the desired position, thereby achieving closed-loop control.

In some embodiments of the present invention, the support element 1700 is disposed in the opening 1125 of the base 1120 and passes through the opening 1134 of the frame 1130 and the opening 1220 of the movable portion 1200 to provide support for the movement of the movable portion 1200 relative to the fixed portion 1100, and make the movable portion 1200 move more smoothly relative to the fixed portion 1100.

In some embodiments of the present invention, the protective component 1800 is configured to correspond to the driving component 1300. The protective component 1800 includes a first protective element 1810, a second protective element 1820, a first intermediate element 1830 (FIG. 4), a second intermediate element 1840, and a third intermediate element 1850 (FIG. 4).

Please briefly refer to FIG. 4. As shown in FIG. 4, the first protective element 1810 is adjacent to the driving component 1300. In particular, the first protective element 1810 is disposed on the top of the housing 1110 facing the base 1120, and surrounds the top of the transmitting element 1320 of the driving component 1300 to position and protect the top of the transmitting element 1320.

As shown in FIG. 4, the second protective element 1820 is disposed between the first protective element 1810 and the driving component 1300. In particular, the second protective element 1820 can be a gel filled between the first protective element 1810 and the transmitting element 1320 of the driving component 1300. The second protective element 1820 directly contacts the first protective element 1810 and the transmitting element 1320 of the driving component 1300.

As shown in FIG. 4, the first protective element 1810 is fixedly connected to the fixed portion 1100 or the movable portion 1200 via the first intermediate element 1830. In the embodiment shown in FIG. 4, the first intermediate element 1830 may be a gel disposed around the first protective element 1810, and the first intermediate element 1830 directly contacts the housing 1110. The Young's modulus of the first intermediate element 1830 is greater than the Young's modulus of the first protective element 1810.

As shown in FIG. 4, the transmitting element 1320 of the driving component 1300 is connected to the fixed portion 1100 or the movable portion 1200 via the second intermediate element 1840. In the embodiment shown in FIG. 4, the second intermediate element 1840 may be a rubber ring disposed between the opening 1132 (FIG. 2) of the frame 1130 of the fixed portion 1100 and the transmitting element 1320 of the driving component 1300. That is, the second intermediate element 1840 directly contacts the transmitting element 1320, and the second intermediate element 1840 directly contacts the frame 1130.

In some embodiments of the present invention, the Young's modulus of the second intermediate element 1840 is different from the Young's modulus of the first protective element 1810. Specifically, the Young's modulus of the second intermediate element 1840 is greater than the Young's modulus of the first protective element 1810, and the Young's modulus of the first intermediate element 1830 is greater than the Young's modulus of the second intermediate element 1840.

As shown in FIG. 4, on the third axis D3, the second intermediate element 1840 is located between the first protective element 1810 and the third intermediate element 1850. The third intermediate element 1850 may be a gel corresponding to the counterweight element 1330 of the driving component 1300.

Specifically, the driving component 1300 is connected to the fixed portion 1110 or the movable portion 1200 via the third intermediate element 1850. In the embodiment shown in FIG. 4, the third intermediate element 1850 directly contacts the driving element 1310 and the counterweight element 1330 of the driving component 1300, and the third intermediate element 1850 directly contacts the base 1120.

In some embodiments of the present invention, the Young's modulus of the third intermediate element 1850 is different from the Young's modulus of the first protective element 1810. In particular, the Young's modulus of the third intermediate element 1850 is greater than the Young's modulus of the first protective element 1810. The Young's modulus of the third intermediate element 1850 is different from the Young's modulus of the second intermediate element 1840. In particular, the Young's modulus of the third intermediate element 1850 is smaller than the Young's modulus of the second intermediate element 1840.

The feature of the present application is that the optical element driving mechanism 1000 has a positioning component for fixedly connecting the frame 1130 to the base 1120. According to some embodiments of the present invention, the positioning component includes a plurality of positioning elements, a plurality of corresponding elements, a first connecting element, a second connecting element and a third connecting element. One of the positioning elements includes a first positioning portion, a second positioning portion, a first reinforcing portion and an outer portion. Another positioning element includes a third positioning portion, a fourth positioning portion, a second reinforcing portion and an outer portion. One of the corresponding elements includes a first corresponding portion, a second corresponding portion and a first containing portion. Another corresponding component includes a third corresponding portion, a fourth corresponding portion and a second containing portion, the details of which are described in detail later.

It should be understood that, in order not to overly limit the implementation of the present application, the configuration of the positioning component in the optical element driving mechanism 1000 is illustrated below with reference to FIG. 5. However, this example should not be used to overly limit the positioning component of the present application. Instead, it should be interpreted according to the scope defined by the claims.

Figure 5:
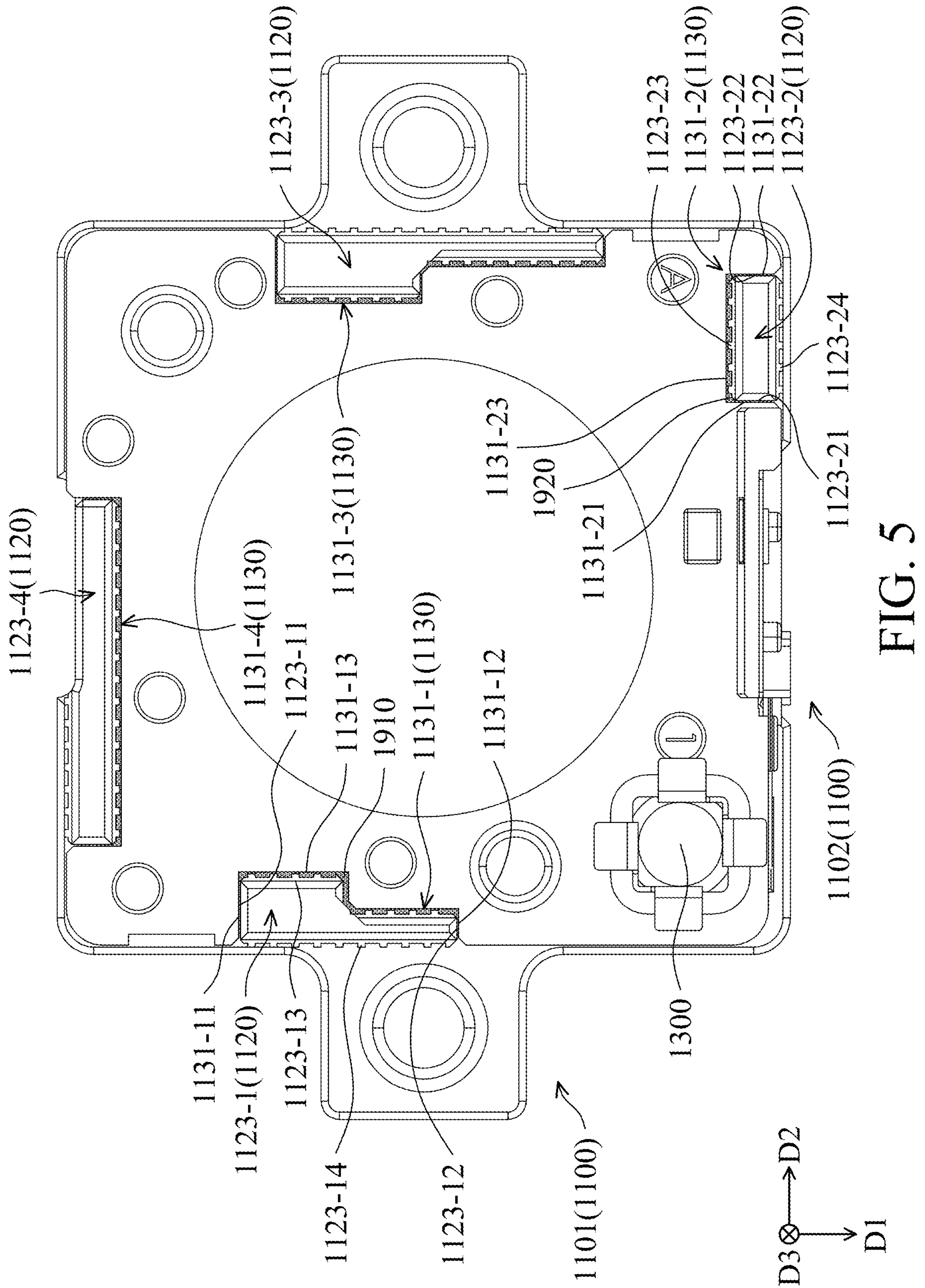
FIG. 5 shows a top view of part of the optical element driving mechanism according to some embodiments of the present invention, in which the housing, the movable portion, the first protective element and the second protective element are not shown for illustrative purposes.

FIG. 5 shows a top view of a portion of the optical element driving mechanism 1000 according to some embodiments of the present invention, in which the housing 1110, the movable portion 1200, the first protective element 1810 and the second protective element 1820 are not shown for illustrative purposes.

As shown in FIG. 5, the base 1120 is provided with positioning elements 1123-1, 1123-2, 1123-3, 1123-4. The positioning element 1123-1 (i.e., the positioning element of the positioning component) and the positioning element 1123-3 are located on opposite sides of the base 1120. The positioning elements 1123-2 and 1123-4 are located on opposite sides of the base 1120. As shown in FIG. 5, the positioning element 1123-1 is located on the first side 1101 of the fixed portion 1100. The positioning element 1123-2 is located on the second side 1102 of the fixed portion 1100.

Similarly, the frame 1130 is provided with corresponding elements 1131-1, 1131-2, 1131-3, 1131-4. The corresponding element 1131-1 (i.e., the corresponding element of the positioning component) and the corresponding element 1131-3 are located on opposite sides of the frame 1130. both sides. The corresponding element 1131-2 and the corresponding element 1131-4 are located on opposite sides of the frame 1130.

As shown in FIG. 5, when viewed along the third axis D3, the positioning element 1123-1 and the positioning element 1123-3 have a long strip structure extending along the first axis D1. When viewed along the third axis D3, the positioning element 1123-2 and the positioning element 1123-4 have a long strip structure extending along the second axis D2.

In some embodiments of the present invention, the frame 1130 is fixedly connected to the base 1120 via the positioning component. The positioning element 1123-1 corresponds to the corresponding element 1131-1, and is received in the corresponding element 1131-1. The positioning element 1123-2 corresponds to the corresponding element 1131-2, and is received in the corresponding element 1131-2. The positioning element 1123-3 corresponds to corresponding element 1131-3, and is received in the corresponding element 1131-3. The positioning element 1123-4 corresponds to the corresponding element 1131-4, and is received in the corresponding element 1131-4.

For brevity, the positioning elements 1123-1 and 1123-2 and the corresponding elements 1131-1 and 1131-2 are used for description here. The positioning element 1123-1 includes a first positioning portion 1123-11 (i.e., the first positioning portion of the positioning component), a second positioning portion 1123-12 (i.e., the second positioning portion of the positioning component), a first reinforcing portion 1123-13 (i.e., the first reinforcing portion of the positioning component) and an outer portion 1123-14 (i.e., the outer portions of the positioning component).

The corresponding component 1131-1 includes a first corresponding portion 1131-11 (i.e., the first corresponding portion of the positioning component), a second corresponding portion 1131-12 (i.e., the second corresponding portion of the positioning component) and a first containing portion 1131-13 (i.e., the first containing portion of the positioning component).

The positioning element 1123-2 includes a third positioning portion 1123-21 (i.e., the third positioning portion of the positioning component), a fourth positioning portion 1123-22 (i.e., the fourth positioning portion of the positioning component), a second reinforcing portion 1123-23 (i.e., the second reinforcing portion of the positioning component) and an outer portion 1123-24.

The corresponding element 1131-2 includes a third corresponding portion 1131-21 (i.e., the third corresponding portion of the positioning component), a fourth corresponding portion 1131-12 (i.e., the fourth corresponding portion of the positioning component) and a second containing portion 1131-23 (i.e., the second containing portion of the positioning component).

The first positioning portion 1123-11 is located on the positioning element 1123-1. In other words, the first positioning portion 1123-11 and the second positioning portion 1123-12 may be considered as the two sides of the positioning elements 1123-1 that is arranged along the first axis D1, with their surfaces parallel to the second axis D2. The first reinforcing portion 1123-13 is formed on the positioning element 1123-1. The first corresponding portion 1131-11 is located on the corresponding element 1131-1.

The first corresponding portion 1131-11 corresponds to the first positioning portion 1123-11. The second corresponding portion 1131-12 corresponds to the second positioning portion 1123-12. The third corresponding portion 1131-21 corresponds to the third positioning portion 1123-21. The fourth corresponding portion 1131-22 corresponds to the fourth positioning portion 1123-22.

As shown in FIG. 5, the maximum distance between the first positioning portion 1123-11 and the first corresponding portion 1131-11 is smaller than the maximum distance between the first reinforcing portion 1123-13 and the first containing portion 1131-13. In other words, the first positioning portion 1123-11 and the first corresponding portion 1131-11 are in a tight fitting configuration, and the first reinforcing portion 1123-13 and the first containing portion 1131-13 are in a loose fitting configuration.

This configuration considers the torque generated by the driving component 1300 relative to the positioning component when the optical element driving mechanism 1000 is dropped. Therefore, the corresponding positioning portions (e.g., the first positioning portion 1123-11) and corresponding portions (e.g., the first corresponding portion 1131-11) are provided accordingly. In this way, misalignment between the base 1200 and the frame 1300 when the optical element driving mechanism 1000 is dropped can be avoided, thus preventing the driving element 1310 (as shown in FIG. 2) from breaking. This strengthens the overall structure.

In some embodiments of the present invention, the first positioning portion 1123-11 and the second positioning portion 1123-12 are arranged along the first axis D1, and the third positioning portion 1123-21 and the fourth positioning portion 1123-22 are arranged along the second axis D2. The first axis D1 is perpendicular to the second axis D2.

In some embodiments of the present invention, the first positioning portion 1123-11 and the second positioning portion 1123-12 are located on the first side 1101 of the fixed portion 1100, and the third positioning portion 1123-21 and the fourth positioning portion 1123-22 on the second side 1102 of the fixed portion 1100.

In some embodiments of the present invention, the first reinforcing portion 1123-13 is located between the first positioning portion 1123-11 and the second positioning portion 1123-12. The first containing portion 1131-13 corresponds to the first reinforcing portion 1123-13. In some embodiments of the present invention, the second reinforcing portion 1123-23 is located between the third positioning portion 1123-21 and the fourth positioning portion 1123-22. The second containing portion 1131-23 corresponds to the second reinforcing portion 1123-23.

The first connecting element 1910 can be a gel disposed between the first reinforcing portion 1123-13 and the first containing portion 1131-13 to strengthen the connection between the positioning element 1123-1 and the corresponding element 1131-1.

Similarly, the second connecting element 1910 can be a gel disposed between the second reinforcing portion 1123-23 and the second containing portion 1131-23 to strengthen the connection between the positioning element 1123-2 and the corresponding element 1131-2.

It should be understood that corresponding connecting elements are also provided between the positioning element 1123-3 and the corresponding element 1131-3 and between the positioning element 1123-4 and the corresponding element 1131-4, but for the sake of brevity, they are not redundantly described here.

FIG. 6 shows a partial enlarged view of the optical element driving mechanism 1000 according to some embodiments of the present invention. The housing 1110 is fixedly connected to the frame 1130 or the base 1120 via a positioning component. Specifically, in the embodiment shown in FIG. 6, the housing 1110 is fixedly connected to the base 1120 via the outer portion (e.g., the outer portion 1123-14 in FIG. 6) of the positioning component.

According to some embodiments of the present invention, the outer portion 1123-14 is configured to correspond to the housing 1110 of the fixed portion, and the surface of the outer portion 1123-14 is composed of a plurality of groove structures for disposing a third connecting element 1930 therein. In this way, the contact area between the outer portion 1123-14 and the third connecting element 1930 can be increased to strengthen the connection between the two.

The outer portion 1123-14 is provided on the side of the positioning element 1123-1 opposite to the first reinforcing portion 1123-13. Similarly, the surface of the first reinforcing portion 1123-13 is also composed of a plurality of groove structures. In this way, the contact area between the first reinforcing portion 1123-13 and the first connecting element 1910 can be increased to strengthen the connection between the reinforcing portion 1123-13 and the first containing portion 1131-13.

It should be understood that the surface of each positioning element 1123-1, 1123-2, 1123-3, 1123-4 (FIG. 5) corresponding to the housing 1110 of the fixed portion is formed with the outer portion as shown in FIG. 6, with the third connecting element 1930 provided therein, so that the housing 1110 is fixedly connected to the base 1120 via the outer portion. However, for the sake of brevity, only the description of the outer portion 1123-14 shown in FIG. 6 is provided as an example.

FIG. 7 shows a cross-sectional view taken along line B-B' in FIG. 1. As shown in FIG. 7, the support element 1700 is fixedly disposed in the opening 1125 of the base 1120 and passes through the opening 1134 of the frame 1130. It should be noted that the circumferential gap between the support element 1700 and the opening 1125 of the base 1120 is larger than the circumferential gap between the support element 1700 and the opening 1134 of the frame 1130.

In other words, the supporting element 1700 is disposed in the base 1120 in a loose fitting configuration, and an adhesive element (not shown) is disposed in the opening 1125 of the base 1120 to strengthen the connection between the base 1120 and the frame 1130. The support element 1700 is disposed in the frame 1130 in a tight fitting configuration, and an adhesive element (not shown) may be provided at the top end of the support element 1700 that contacts the opening 1134 of the frame 1130 to further strengthen the connection between the base 1120 and the frame 1130.

The special relative position and size relationship of each component disclosed in the present invention not only enables the driving mechanism to be thinned in a specific direction and miniaturized overall, but also, through the configuration of positioning component, it prevents the driving element of the optical element driving mechanism from breaking due to misalignment between the base and the frame when the optical element driving mechanism falls. This enhances the overall structural integrity of the invention.

Although the embodiments and advantages of the present invention have been disclosed above, it should be understood that anyone with ordinary skill in the art can make modifications, substitutions and modifications without departing from the spirit and scope of the present invention. In addition, each claim constitutes an individual embodiment, and the protection scope of the present invention also includes the combination of each claims and embodiments.

In addition, the driving component of the present invention includes piezoelectric material, which, compared to setups like voice coil motors, achieve energy savings. In particular, when the movable portion needs to be fixed in one position relative to the fixed portion, using a setup with a voice coil motor requires maintaining electrical current for this purpose. On the contrary, in the present application, by employing piezoelectric materials as the driving component, it is unnecessary to maintain the driving component with an electrical current to fix the movable portion relative to the fixed portion in one position.

The above embodiments are described in sufficient detail to enable those with ordinary skill in the art to implement the devices disclosed in the present invention through the above descriptions. It should be understood that minor modifications and refinements can be made within the spirit and scope of the present invention. Therefore, the scope of protection of this the present invention should be determined by the claims appended hereto.

What is claimed is:

1. An optical element driving mechanism, comprising:

a movable portion for connecting an optical element;

a fixed portion, wherein the movable portion is movable relative to the fixed portion; and a driving component configured to drive the movable portion to move relative to the fixed portion;

wherein the fixed portion comprises:

a frame;

a base fixedly connected to the frame; and a positioning component, wherein the frame is fixedly connected to the base via the positioning component;

wherein the driving component is partially connected to the frame, and the driving component is partially connected to the base;

wherein the fixed portion has a first side and a second side, and the positioning component comprises:

a first positioning portion;

a first corresponding portion corresponding to the first positioning portion, wherein the first positioning portion is located on the frame or the base, and the first corresponding portion is located on the other of the frame or the base;

a second positioning portion;

a second corresponding portion corresponding to the second positioning portion;

a third positioning portion;

a third corresponding portion corresponding to the third positioning portion;

a fourth positioning portion; and a fourth corresponding portion corresponding to the fourth positioning portion;

wherein the first positioning portion and the second positioning portion are arranged along a first axis, the third positioning portion and the fourth positioning portion are arranged along a second axis, the first axis and the second axis are not parallel, the first positioning portion and the second positioning portion are located on the first side of the fixed portion, and the third positioning portion and the fourth positioning portion are located on the second side of the fixed portion.

2. The optical element driving mechanism as claimed in claim 1, wherein the positioning component further comprises:

a first reinforcing portion located between the first positioning portion and the second positioning portion;

a first containing portion corresponding to the first reinforcing portion;

a first connecting element disposed between the first reinforcing portion and the first containing portion;

a second reinforcing portion located between the third positioning portion and the fourth positioning portion;

a second containing portion corresponding to the second reinforcing portion; and a second connecting element disposed between the second reinforcing portion and the second containing portion;

wherein the maximum distance between the first positioning portion and the first corresponding portion is smaller than the maximum distance between the first reinforcing portion and the first containing portion.

3. The optical element driving mechanism as claimed in claim 2, wherein the positioning component further comprises:

a positioning element located on the first side of the fixed portion, wherein the first positioning portion is located on the positioning element, and the first reinforcing portion is formed on the positioning element; and a corresponding element corresponding to the positioning element, wherein the first corresponding portion is located on the corresponding element;

wherein, when viewed along a third axis, the positioning element has a long strip structure extending along the first axis.

4. The optical element driving mechanism as claimed in claim 3, wherein the fixed portion further comprises a housing that is fixedly connected to the frame or the base via the positioning component.

5. The optical element driving mechanism as claimed in claim 4, wherein the positioning component comprises an outer portion and a third connecting element, the outer portion is configured to correspond to the housing of the fixed portion, the outer portion has a groove, the third connecting element is disposed on the outer portion, and the outer portion is formed on the positioning element.

6. The optical element driving mechanism as claimed in claim 1, wherein the driving component comprises:

a driving element configured to generate a driving force;

a transmitting element configured to transmit the driving force; and a counterweight element made of metal and connected to the driving element, wherein the driving element is located between the transmitting element and the counterweight element;

wherein the transmitting element is connected to the frame, the counterweight element is connected to the base, and the driving element does not contact the base nor the frame.

7. The optical element driving mechanism as claimed in claim 6, further comprising a protective component corresponding to the driving component, and the fixed portion further comprises a housing, wherein the protective component comprises:

a first protective element surrounding the driving component;

a second protective element disposed between the first protective element and the driving component, wherein the second protective element directly contacts the first protective element and the driving component; and a first intermediate element, wherein the Young's modulus of the first intermediate element is greater than the Young's modulus of the first protective element, and the first intermediate element directly contacts the housing, wherein the first protective element is fixedly connected to the fixed portion or the movable portion via the first intermediate element.

8. The optical element driving mechanism as claimed in claim 7, wherein the protective component further comprises a second intermediate element, wherein the driving component is connected to the fixed portion or the movable portion via the second intermediate element.

9. The optical element driving mechanism as claimed in claim 8, wherein the Young's modulus of the second intermediate element is different from the Young's modulus of the first protective element.

10. The optical element driving mechanism as claimed in claim 8, wherein the Young's modulus of the second intermediate element is greater than the Young's modulus of the first protective element.

11. The optical element driving mechanism as claimed in claim 8, wherein the second intermediate element directly contacts the transmitting element, and the second intermediate element directly contacts the frame.

12. The optical element driving mechanism as claimed in claim 8, wherein the Young's modulus of the first intermediate element is greater than the Young's modulus of the second intermediate element.

13. The optical element driving mechanism as claimed in claim 8, wherein the protective component further comprises a third intermediate element, and the third intermediate element directly contacts the counterweight element, the driving element and the base.

14. The optical element driving mechanism as claimed in claim 13, wherein the second intermediate element is located between the first protective element and the third intermediate element, wherein the driving component is connected to the fixed portion or the movable portion via the third intermediate element.

15. The optical element driving mechanism as claimed in claim 13, wherein the Young's modulus of the third intermediate element is different from the Young's modulus of the first protective element.

16. The optical element driving mechanism as claimed in claim 13, wherein the Young's modulus of the third intermediate element is greater than the Young's modulus of the first protective element.

17. The optical element driving mechanism as claimed in claim 13, wherein the Young's modulus of the third intermediate element is different from the Young's modulus of the second intermediate element.

18. The optical element driving mechanism as claimed in claim 13, wherein the Young's modulus of the third intermediate element is smaller than the Young's modulus of the second intermediate element.

* * * * *